United States Patent
Xu et al.

(10) Patent No.: US 10,210,827 B2
(45) Date of Patent: Feb. 19, 2019

(54) DRIVING SUBSTRATE AND DRIVING METHOD THEREOF, AND LIQUID CRYSTAL DISPLAY DEVICE

(71) Applicants: BOE Technology Group Co., Ltd., Beijing (CN); Beijing BOE Optoelectronics Technology Co., Ltd., Beijing (CN)

(72) Inventors: Rui Xu, Beijing (CN); Xiaochuan Chen, Beijing (CN); Qian Wang, Beijing (CN); Lei Wang, Beijing (CN); Jian Gao, Beijing (CN); Ming Yang, Beijing (CN); Wenqing Zhao, Beijing (CN); Pengcheng Lu, Beijing (CN); Xiaochen Niu, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/539,707

(22) PCT Filed: Aug. 26, 2016

(86) PCT No.: PCT/CN2016/096883
§ 371 (c)(1),
(2) Date: Jun. 26, 2017

(87) PCT Pub. No.: WO2017/173769
PCT Pub. Date: Oct. 12, 2017

(65) Prior Publication Data
US 2018/0082648 A1 Mar. 22, 2018

(30) Foreign Application Priority Data
Apr. 8, 2016 (CN) .......................... 2016 1 0217800

(51) Int. Cl.
*G09G 3/36* (2006.01)
*G02F 1/1335* (2006.01)
(Continued)

(52) U.S. Cl.
CPC ..... *G09G 3/3607* (2013.01); *G02F 1/133528* (2013.01); *G02F 1/133621* (2013.01);
(Continued)

(58) Field of Classification Search
None
See application file for complete search history.

(56) References Cited

U.S. PATENT DOCUMENTS

| 6,590,553 B1 | 7/2003 | Kimura et al. |
| 2007/0236435 A1 | 10/2007 | Miyazaki et al. |

(Continued)

FOREIGN PATENT DOCUMENTS

| CN | 1677476 A | 10/2005 |
| CN | 1825413 A | 8/2006 |

(Continued)

OTHER PUBLICATIONS

Nov. 3, 2017—(CN) First Office Action Appn 201610217800.8 with English Tran.

(Continued)

*Primary Examiner* — Joseph R Haley
(74) *Attorney, Agent, or Firm* — Banner & Witcoff, Ltd.

(57) ABSTRACT

A driving substrate and a driving method thereof and a liquid crystal display device. The driving substrate includes driving electrodes and a control chip. A time period of a frame is divided into at least a first time period, a second time period and a third time period. The control chip configured to: in the first time period, apply a first group of data voltages to respective driving electrodes to control corresponding pixels to be equivalent to liquid crystal lenses having first (Continued)

curvatures; in the second time period, apply a second group of data voltages to the respective driving electrodes to control the corresponding pixels to be equivalent to liquid crystal lenses having second curvatures; and in the third time period, apply a third group of data voltages to the respective driving electrodes to control the corresponding pixels to be equivalent to liquid crystal lenses having third curvatures.

18 Claims, 3 Drawing Sheets

(51) Int. Cl.
    *G09G 3/34*     (2006.01)
    *G09G 5/02*     (2006.01)
    *G02F 1/29*     (2006.01)

(52) U.S. Cl.
    CPC ......... *G09G 3/3413* (2013.01); *G09G 3/3648* (2013.01); *G09G 3/3677* (2013.01); *G09G 3/3688* (2013.01); *G09G 5/026* (2013.01); *G02F 1/29* (2013.01); *G02F 2001/133622* (2013.01); *G02F 2201/121* (2013.01); *G02F 2203/30* (2013.01); *G09G 2300/0426* (2013.01); *G09G 2300/0452* (2013.01)

(56) References Cited

U.S. PATENT DOCUMENTS

| | | | |
|---|---|---|---|
| 2008/0024404 | A1 | 1/2008 | Tanaka et al. |
| 2012/0293503 | A1* | 11/2012 | Miyazawa ......... G02B 27/2214 345/419 |
| 2017/0103716 | A1* | 4/2017 | Kita ..................... G09G 3/3413 |

FOREIGN PATENT DOCUMENTS

| | | |
|---|---|---|
| CN | 1989542 A | 6/2007 |
| CN | 1991966 A | 7/2007 |
| CN | 101458904 A | 6/2009 |
| CN | 101656055 A | 2/2010 |
| CN | 101661717 A | 3/2010 |
| CN | 104412318 A | 3/2015 |
| CN | 105137656 A | 12/2015 |
| CN | 105741804A A | 7/2016 |

OTHER PUBLICATIONS

Dec. 27, 2016—(WO) International Search Report and Written Opinion Appn PCT/CN2016/096883 with English Translation.

\* cited by examiner

DRIVING SUBSTRATE AND DRIVING METHOD THEREOF, AND LIQUID CRYSTAL DISPLAY DEVICE

The application is a U.S. National Phase Entry of International Application No. PCT/CN2016/096883 filed on Aug. 26, 2016, designating the United States of America and claiming priority to Chinese Patent Application No. 201610217800.8 filed on Apr. 8, 2016. The present application claims priority to and the benefit of the above-identified applications and the above-identified applications are incorporated by reference herein in their entirety.

TECHNICAL FIELD

The present disclosure relates to a driving substrate and a driving method thereof, and a liquid crystal display device.

BACKGROUND

A conventional liquid crystal display device comprises: a liquid crystal cell, an upper polarizer provided above the liquid crystal cell, a lower polarizer provided below the liquid crystal cell, and a backlight source provided on a side of the lower polarizer away from the liquid crystal cell, where polarization axis directions of the upper polarizer and the lower polarizer are perpendicular to each other. A display principle of the above-described liquid crystal display device is that: different data voltages are applied to respective sub-pixels of the liquid crystal cell respectively, to drive liquid crystal molecules of the respective sub-pixels to be deflected in different degrees; after lights emitted from the backlight source pass through the lower polarizer, they change from natural lights to linearly polarized lights, which then pass through the liquid crystal cell. Since the liquid crystal molecules of the respective sub-pixels of the liquid crystal cell are deflected in different degrees, the linearly polarized lights pass through the respective sub-pixels of the liquid crystal cell and then have their polarization directions to be changed in different manners. Finally, lights pass through the upper polarizer, and the upper polarizer performs polarization analysis on the lights, so that amounts of lights emitted from the respective sub-pixels are different, so as to implement gray-scale display. Since a polarizer only allows a light component whose polarization direction is parallel to a polarization axis direction of the polarizer to pass, there is more light loss when lights pass through the upper polarizer and the lower polarizer, resulting in reduction of light utilization efficiency of the liquid crystal display device.

SUMMARY

Embodiments of the disclosure provide a driving substrate, comprising: a base substrate having a plurality of pixel regions thereon; a plurality of driving electrodes provided on the base substrate, each pixel region being provided therein with at least three of the plurality of driving electrodes; and a control chip provided on a periphery of the base substrate, the control chip being connected with the plurality of driving electrodes. An image frame is decomposed into at least a first color image, a second color image and a third color image, a time period of the image frame is divided into at least a first time period, a second time period and a third time period, and the control chip is configured to: in the first time period, apply a first group of data voltages to driving electrodes within each pixel region to control corresponding pixels to be equivalent to liquid crystal lenses having first curvatures, so that the corresponding pixels display gray scales of the first color image; in the second time period, apply a second group of data voltages to the driving electrodes within each pixel region to control the corresponding pixels to be equivalent to liquid crystal lenses having second curvatures, so that the corresponding pixels display gray scales of the second color image; and in the third time period, apply a third group of data voltages to the driving electrodes within each pixel region to control the corresponding pixels to be equivalent to liquid crystal lenses having third curvatures, so that the corresponding pixels display gray scales of the third color image.

Embodiments of the disclosure provide a driving method of a driving substrate, for driving the driving substrate described above, comprising: decomposing an image frame into at least a first color image, a second color image, and a third color image, and dividing a time period of the image frame into at least a first time period, a second time period and a third time period; in the first time period, applying a first group of data voltages to the driving electrodes within each pixel region of the driving substrate to control corresponding pixels to be equivalent to liquid crystal lenses having first curvatures, so that the corresponding pixels display gray scales of the first color image; in the second time period, applying a second group of data voltages to the driving electrodes within each pixel region to control the corresponding pixels to be equivalent to liquid crystal lenses having second curvatures, so that the corresponding pixels display gray scales of the second color image; and in the third time period, applying a third group of data voltages to the driving electrodes within each pixel region to control the corresponding pixels to be equivalent to liquid crystal lenses having third curvatures, so that the corresponding pixels display gray scales of the third color image.

Embodiments of the disclosure provide a liquid crystal display device, comprising: the driving substrate described above; a common substrate provided opposite to the driving substrate, the common substrate including a transparent substrate and a common electrode provided on the transparent substrate; a liquid crystal layer provided between the driving substrate and the common substrate; a polarizer provided on a side of the driving substrate away from the liquid crystal layer or on a side of the common substrate away from the liquid crystal layer; and a backlight module provided on a side of the liquid crystal layer away from the liquid crystal layer, the backlight module configured to emit light rays of a first color in a first time period of time, emit light rays of a second color in a second time period, and emit light rays of a third color in a third time period.

BRIEF DESCRIPTION OF THE DRAWINGS

In order to illustrate the technical solutions in the embodiments of the present disclosure or the existing arts more clearly, the drawings need to be used in the description of the embodiments or the existing arts will be briefly described in the following; it is obvious that the drawings described below are only related to some embodiments of the present disclosure, for one ordinary skilled person in the art, other drawings can be obtained according to these drawings without making other inventive work.

REFERENCE SIGNS

Figure 1:
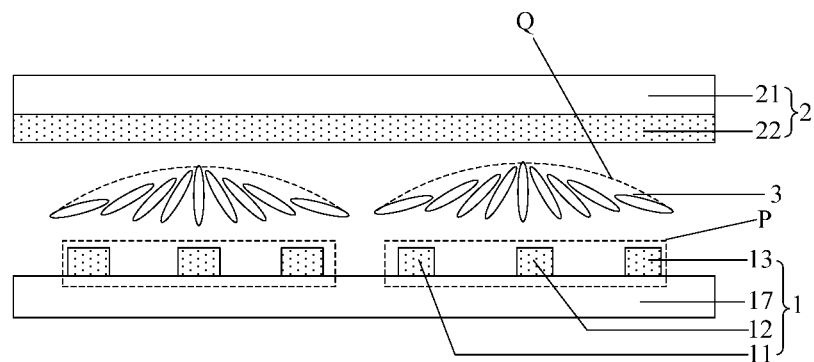
FIG. 1 is a cross-sectional structural schematic diagram of a liquid crystal cell where a driving substrate is located provided by a first embodiment of the present disclosure.

| | |
|---|---|
| 1-driving substrate; | 11-first driving electrode; |
| 12-second driving electrode; | 13-third driving electrode; |
| 14-first driving switch transistor; | 15-second driving switch transistor; |
| 16-third driving switch transistor; | 17-base substrate; |
| SW1-first driving line; | SW2-second driving line; |
| SW3-third driving line; | Data-data line; |
| Data1-first data line; | Data2-second data line; |
| Data3-third data line; | L-connection line; |
| L1-first connection line; | L2-second connection line; |
| L3-third connection line; | L'-lead; |
| L1'-first lead; | L2'-second lead; |
| L3'-third lead; | P-pixel region; |
| 2-common substrate; | 21-transparent substrate; |
| 22-common electrode; | Q-liquid crystal lens; |
| 3-liquid crystal layer; | 4-polarizer; |
| 5-backlight module; | 50-control chip; |
| 51-gate driver; | 52-data driver. |

DETAILED DESCRIPTION

In order to illustrate the purposes, features and advantages of the disclosure more clear, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. Based on embodiments of the present disclosure, all other embodiments obtained by those skilled in the art without making other inventive work should be within the scope of the present disclosure.

In order to improve light utilization efficiency of liquid crystal display devices, a liquid crystal display device is proposed in related technologies. In the liquid crystal display device, a lower substrate of a liquid crystal cell is not a conventional thin film transistor (TFT) array substrate, but a driving substrate which can make each sub-pixel equivalent to a liquid crystal lens. The driving substrate includes a base substrate, the base substrate has a plurality of sub-pixel regions thereon, and each sub-pixel region is provided therein with at least three driving electrodes. Different data voltages may be applied to respective driving electrodes in each sub-pixel region respectively, to control deflection of liquid crystal molecules in a corresponding region, and finally, each sub-pixel may be equivalent to a liquid crystal lens. By controlling the data voltages applied to the driving electrodes, it is possible to achieve control of a curvature of the liquid crystal lens that is equivalent to the sub-pixel, so as to control a divergence angle of light emitted from the sub-pixel, and further to implement control of a gray scale of each sub-pixel. Since just by using the above-described driving substrate itself, the control of the gray scale of each sub-pixel may be implemented, it does not need to implement gray-scale display by performing polarization analysis on the light with an upper polarizer, so that the upper polarizer in the conventional TFT array substrate can be omitted, which improves light utilization efficiency of the liquid crystal display device.

In the above-described driving substrate, in order to apply the data voltages to respective driving electrodes, it needs to dispose wires in a non-display region of the driving substrate. However, since it needs to make each sub-pixel to be equivalent to a liquid crystal lens, at least three driving electrodes are provided in each sub-pixel, resulting in too many driving electrodes on the driving substrate and too many corresponding wires, which results in an excessively large wiring area. Thus, it may cause reduction of a pixel aperture ratio and widening of a frame of the liquid crystal display device.

Embodiments of the present disclosure provide a driving substrate and a driving method thereof, and a liquid crystal display device, to solve the existing problem of the excessively large wiring area of the driving substrate.

First Embodiment

Figure 2:
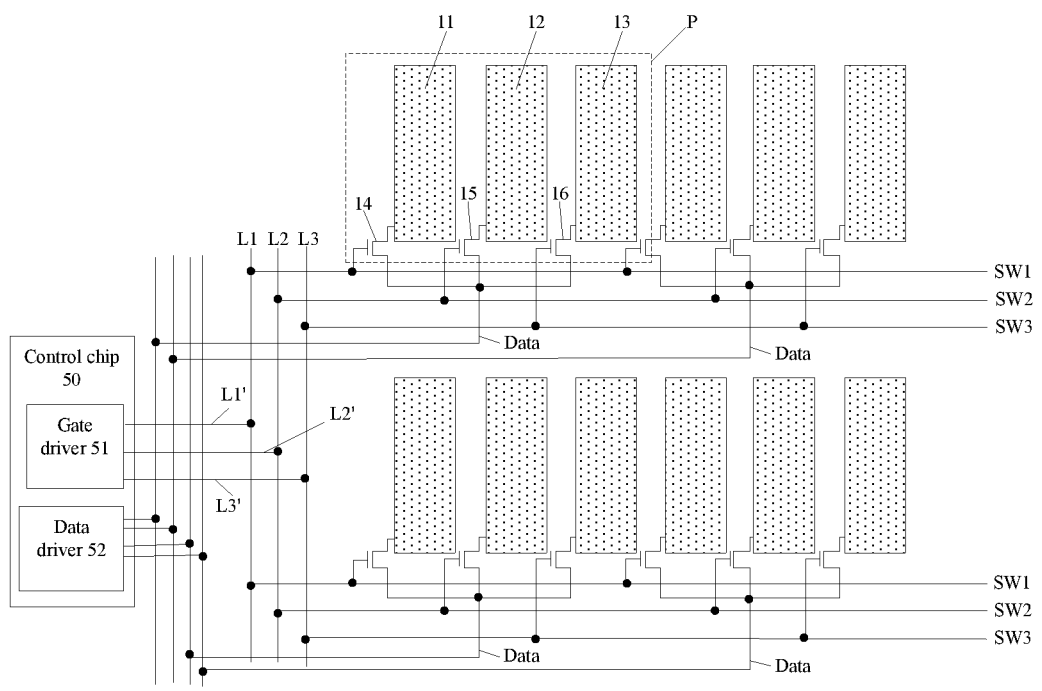
FIG. 2 is a plane structural diagram of the driving substrate provided by the first embodiment of the present disclosure.

With reference to FIG. 1 and FIG. 2, this embodiment provides a driving substrate 1, the driving substrate 1 comprising: a base substrate 17, driving electrodes (e.g., a first driving electrode 11, a second driving electrode 12 and a third driving electrode 13 as shown in FIG. 1 and FIG. 2) and a control chip 50 (as shown in FIG. 2), where: the base substrate 17 has a plurality of pixel regions P; the driving electrodes are provided on the base substrate 17, and each pixel region P of the base substrate 17 is provided therein with a plurality of driving electrodes; and the control chip 50 is provided on a periphery of the base substrate 17 and is connected with respective driving electrodes.

In the above-described driving substrate 1, the control chip is configured to: decompose an image frame into at least a first color image, a second color image and a third color image, and divide a time period of one frame into at least a first time period, a second time period and a third time period; in the first time period, the control chip applies a first group of data voltages to the driving electrodes within each pixel region, to control a corresponding pixel to be equivalent to a liquid crystal lens Q having a first curvature, so that the corresponding pixel displays a corresponding gray scale in the first color image; in the second time period, the control chip applies a second group of data voltages to the driving electrodes within each pixel region, to control a corresponding pixel to be equivalent to a liquid crystal lens Q having a second curvature, so that the corresponding pixel displays a corresponding gray scale in the second color image; and in the third time period, the control chip applies a third group of data voltages to the driving electrodes within each pixel region, to control a corresponding pixel to be equivalent to a liquid crystal lens Q having a third curvature, so that the corresponding pixel displays a corresponding gray scale in the third color image.

It should be noted that, an image frame includes a plurality of colors, so that an image frame may be decomposed into a plurality of single-color images. For example: an image frame includes three primary colors, i.e., red, green and blue, and thus, an image frame may be decomposed into a red image (i.e., the above-described first color image), a green image (i.e., the above-described second color image) and a blue image (i.e., the above-described third color image).

It can be seen from a function of the control chip of the above-described driving substrate 1 that, a process for the control chip to control the pixels to display includes: decomposing an image frame into images of at least three colors, correspondingly dividing the time period of one frame into at least three time periods, and respectively displaying an image of a corresponding color in respective time periods, so as to synthesize images of different colors seen in respective time periods into one frame of a complete image by using a visual staying phenomenon of human eyes, so that normal display of the image frame is implemented. Based on the above-described control process, since in each time period, it only needs to display an image of one color, each pixel in each time period only needs to display one gray scale, so that each pixel in each time period only needs to be equivalent to one liquid crystal lens. However, in the prior art, each pixel needs to simultaneously display at least three colors, so that each pixel at least needs to be equivalent to three liquid crystal lenses. Thus, as compared with that in the prior art, it can be seen that the driving substrate 1 provided by this embodiment of the disclosure can reduce the number of liquid crystal lenses that each pixel needs to be equivalent to, so as to reduce the number of driving electrodes on the driving substrate 1 for driving the pixels to be equivalent to the liquid crystal lenses. Further, the number of wires for applying voltages to the driving electrodes is reduced, that is, the required wiring area is reduced. Since the wires are usually arranged in a non-display region of the driving substrate 1 and the non-display region includes a frame region and a gap region between adjacent pixels, in the driving substrate 1 according to this embodiment, reduction of the wiring area is equivalent to reduction of the frame region and the gap region between adjacent pixels, which facilitates reduction of the frame of the driving substrate 1 and improves a pixel aperture ratio of the driving substrate 1.

In the driving substrate 1 provided by this embodiment, the number of driving electrodes can be less than that in the prior art. For example, the number of driving electrodes provided within each pixel region of the driving substrate 1 may be 3 to 8.

In this embodiment, in order to control the data voltages of respective driving electrodes on the driving substrate 1, a plurality of driving switch transistors (for example, a first driving switch transistor 14, a second driving switch transistor 15 and a third driving switch transistor 16 as shown in FIG. 2), a plurality of driving lines (for example, a first driving line SW1, a second driving line SW2 and a third driving line SW3 as shown in FIG. 2) and a plurality of data lines Data may be provided on the base substrate 17 of the driving substrate 1. For example, each pixel region P is provided therein with a plurality of driving switch transistors, the driving electrodes within each pixel region P correspond to the driving switch transistors one by one, and the respective driving electrodes within each pixel region P are connected with output ends of the corresponding driving switch transistors. Each row of pixel regions P corresponds to at least one driving line, and control ends of respective driving switch transistors within each row of pixel regions P are connected with the at least one driving line corresponding to the row of pixel regions P. Each pixel region P corresponds to at least one data line Data, and output ends of respective driving switch transistors within each pixel region P are connected with the corresponding data lines.

The plurality of driving lines and the plurality of data lines Data included in the driving substrate 1 are all connected with the control chip, so as to achieve an effect that the control chip is connected with the plurality of driving electrodes included in the driving substrate 1.

According to the above-described structure, the control chip applies gate voltages to control ends of the respective driving switch transistors through the respective driving lines, so as to control the switching on and off of the respective driving switch transistors, and further control the switching on and off of the respective driving electrodes connected with the output ends of the respective driving switch transistors; the control chip applies desired data voltages to the output ends of the respective driving switch transistors through the respective data lines, so as to apply the desired data voltages to the driving switch transistors when the driving switch transistors are turned on.

For example, the control chip 50 may include a gate driver 51 and a data driver 52, the gate driver 51 being connected with a plurality of driving lines, and the data driver 52 being connected with a plurality of data lines. The gate driver is configured to: control a corresponding driving switch transistor within each pixel region P to be turned on in the first time period, and control a corresponding driving switch transistor within each pixel region P to be turned on in the second time period, and control a corresponding driving switch transistor within each pixel region P to be turned on in the third time period. The data driver is configured to: input the first group of data voltages to the driving switch transistors within each pixel region P in the first time period, so as to drive the respective pixels to be equivalent to the liquid crystal lenses Q having the first curvatures, so that display of the first color image is implemented; input the second group of data voltages to the driving switch transistors within each pixel region P in the second time period, so as to drive the respective pixels to be equivalent to the liquid crystal lenses Q having the second curvatures, so that display of the second color image is implemented; and input the third group of data voltages to the driving switch transistors within each pixel region P in the third time period, so as to drive the respective pixels to be equivalent to the liquid crystal lenses Q having the third curvatures, so that display of the third color image is implemented. Thus, the display of the first color image, the display of the second color image and the display of the third color image are superimposed to synthesize one frame of the complete image.

Hereinafter, a specific structure of the driving substrate 1 provided by this embodiment will be introduced exemplarily.

With reference to FIG. 2 again, each pixel region P of the driving substrate 1 may be provided therein with at least three driving electrodes, the three driving electrodes are respectively: the first driving electrode 11, the second driving electrode 12, and the third driving electrode 13; each pixel region P may be provided therein with at least three driving switch transistors corresponding to the three driving electrodes, and the three driving switch transistors are respectively: the first driving switch transistor 14, the second driving switch transistor 15 and the third driving switch transistor 16. The first driving electrode 11 corresponds to the first driving switch transistor 14, the first driving electrode 11 is connected with the output end of the first driving switch transistor 14; the second driving electrode 12 corresponds to the second driving switch transistor 15, and the second driving electrode 12 is connected with the output end of the second driving switch transistor 15; and the third driving electrode 13 corresponds to the third driving switch transistor 16, and the third driving electrode 13 is connected with the output end of the third driving switch transistor 16.

A wiring structure of the driving substrate 1 includes: each row of pixel regions P corresponds to three driving lines. For example, three driving lines may be provided above or below each row of pixel regions P, and the three driving lines are respectively: the first driving lines SW1, the second driving line SW2 and the third driving line SW3. Control ends of the respective first driving switch transistors 14 within each row of pixel regions P are connected with the first driving line SW1 corresponding to the row of pixel regions P; the control ends of the respective second driving switch transistors 15 within each row of pixel regions P are connected with the second driving line SW2 corresponding to the row of pixel regions P; and the control ends of the respective third driving switch transistors 16 within each row of pixel regions P are connected with the third driving line SW3 corresponding to the row of pixel regions P. Each pixel region P corresponds to a data line Data, and input ends of the respective driving switch transistors (including the first driving switch transistor 14, the second driving switch transistor 15 and the third driving switch transistor 16) within each pixel region P are connected with the data line Data that corresponds to the pixel region P.

A process to drive the driving substrate 1 with the above-described structure includes, in the first time period of one frame: firstly, applying a gate voltage to respective first gate lines SW1, so that the respective first driving switch transistors 14 are turned on, and at the same time, inputting respective first data voltages to respective data lines Data, so that voltages of the respective first driving electrodes 11 are the respective first data voltages, so as to drive liquid crystal molecules corresponding to the respective first driving electrodes 11 to be deflected; then, applying a gate voltage to respective second gate lines SW2, so that the respective second driving switch transistors 15 are turned on, and at the same time, inputting respective second data voltages to the respective data lines Data, so that voltages of the respective second driving electrodes 12 are the respective second data voltages, so as to drive liquid crystal molecules corresponding to the respective second riving electrodes 12 to be deflected; and finally, applying a gate voltage to respective third gate lines SW3, so that the respective third driving switch transistors 16 are turned on, and at the same time, inputting respective third data voltages to the respective data lines Data, so that voltages of the respective third driving electrodes 13 are the respective third data voltages, so as to drive liquid crystal molecules corresponding to the respective third riving electrodes 13 to be deflected.

For example, the first data voltages, the second data voltages and the third data voltages may be determined according to gray scales of respective pixels in the first color image of the image frame. Specifically, with a gray scale of each pixel in the first color image of the image frame being known, a curvature of a liquid crystal lens Q, which a respective pixel needs to be equivalent to in the first time period of the frame, can be obtained. Then, the corresponding data voltages, i.e., a first data voltage, a second data voltage and a third data voltage, required by the respective driving electrodes in each respective pixel in the first time period of the frame can be obtained.

In the first time period of one frame, for each pixel region P, by applying a first data voltage, a second data voltage and a third data voltage respectively to the first driving electrode 11, the second driving electrode 12 and the third driving electrode 13, liquid crystal molecules respectively corresponding to the three driving electrodes 11, 12 and 13 within the pixel region P are deflected in different degrees, so that the corresponding pixel is finally equivalent to a liquid crystal lens Q. The liquid crystal lens Q has a curvature corresponding to a gray scale which the corresponding pixel needs to display, i.e., the curvature being a first curvature. After light passes through the liquid crystal lens Q having the first curvature, a divergence degree of the light changes, so that an amount of light changes, which affects the gray scale of the pixel, and ultimately enables the pixel to display the desired gray scale.

It should be noted that, since the first color image of an image frame is displayed in the first time period, and gray scales of the respective pixels in the first color image are different, the curvatures of the liquid crystal lenses Q to which the respective pixels need to be equivalent in the first time period are different. That is, the first curvatures of the liquid crystal lenses Q, which the respective pixels need to be equivalent to, are different, so that the first data voltages applied to the first driving electrodes 11 within the respective pixel regions P are different, the second data voltages applied to the second driving electrodes 12 within the respective pixel regions P are different, and the third data voltages applied to the third driving electrodes 13 within respective pixel regions P are different.

A driving process in the second time period is similar to the driving process in the above-described first time period: firstly, applying a gate voltage to respective first gate lines SW1, so that the respective first driving switch transistors 14 are turned on, and at the same time, inputting respective fourth data voltages to the respective data lines Data, so that voltages of the respective first driving electrodes 11 are the respective fourth data voltages, so as to drive liquid crystal molecules corresponding to the respective first driving electrodes 11 to be deflected; then, applying a gate voltage to respective second gate lines SW2, so that the respective second driving switch transistors 15 are turned on, and at the same time, inputting respective fifth data voltages to the respective data lines Data, so that voltages of the respective second driving electrodes 12 are the respective fifth data voltages, so as to drive liquid crystal molecules corresponding to the respective second riving electrodes 12 to be deflected; and finally, applying a gate voltage to respective third gate lines SW3, so that the respective third driving switch transistors 16 are turned on, and at the same time, inputting sixth data voltages to the respective data lines Data, so that voltages of the respective third driving electrodes 13 are the respective sixth data voltages, so as to drive liquid crystal molecules corresponding to the respective third riving electrodes 13 to be deflected.

The fourth data voltages, the fifth data voltages and the sixth data voltages are determined according to gray scales of respective pixels in the second color image of the image frame. For each pixel region P, by applying a fourth data voltage, a fifth data voltage and a sixth data voltage respectively to the first driving electrode 11, the second driving electrode 12 and the third driving electrode 13 in the pixel region P, and then driving the liquid crystal molecules respectively corresponding to the three driving electrodes within the pixel region P to be deflected in different degrees, the pixel is finally equivalent to a liquid crystal lens Q. The liquid crystal lens Q has a curvature corresponding to a gray scale which the pixel needs to display, i.e., the curvature being the second curvature. After light passes through the liquid crystal lens Q having the second curvature, a divergence degree of the light changes, so that an amount of light changes, which affects the gray scale of the pixel, and finally enables the pixel to display the desired gray scale.

A driving process in the third time period is also similar to the driving process in the above-described first time period of one frame: firstly, applying a gate voltage to respective first gate lines SW1, so that the respective first driving switch transistors 14 are turned on, and at the same time, inputting respective seventh data voltages to the respective data lines Data, so that voltages of the respective first driving electrodes 11 are the respective seventh data voltages, so as to drive liquid crystal molecules corresponding to the respective first driving electrodes 11 to be deflected; then, applying a gate voltage to respective second gate lines SW2, so that the respective second driving switch transistors 15 are turned on, and at the same time, inputting respective eighth data voltages to the respective data lines Data, so that voltages of the respective second driving electrodes 12 are the respective eighth data voltages, so as to drive liquid crystal molecules corresponding to the respective second riving electrodes 12 to be deflected; finally, applying a gate voltage to respective third gate lines SW3, so that the respective third driving switch transistors 16 are turned on, and at the same time, inputting respective ninth data voltages to the respective data lines Data, so that voltages of the respective third driving electrodes 13 are the respective ninth data voltages, so as to drive liquid crystal molecules corresponding to the respective third riving electrodes 13 to be deflected.

The seventh data voltages, the eighth data voltages, and the ninth data voltages are determined according to gray scales of the respective pixels in the third color image of the image frame. For each pixel region P, by applying a seventh data voltage, an eighth data voltage and a ninth data voltage respectively to the first driving electrode 11, the second driving electrode 12 and the third driving electrode 13 of the pixel region P, and then driving liquid crystal molecules respectively corresponding to the three driving electrodes within the pixel region P to be deflected in different degrees, the pixel is finally equivalent to a liquid crystal lens Q. The liquid crystal lens Q has a curvature corresponding to the gray scale which the pixel needs to display, i.e., the curvature being the third curvature. After light passes through the liquid crystal lens Q having the third curvature, a divergence degree of the light changes, so that an amount of light changes, which affects the gray scale of the pixel, and finally enables the pixel to display the desired gray scale.

In this way, by the driving processes described above in the first time period, the second time period and the third time period, the first color image, the second color image and the third color image are sequentially displayed. Due to the visual staying phenomenon of the human eyes, the human eyes are unable to distinguish an order of displaying the first color image, the second color image and the third color image. For human eyes, the first color image, the second color image and the third color image are superimposed, and finally synthesized into one frame of a complete image.

Figure 3:
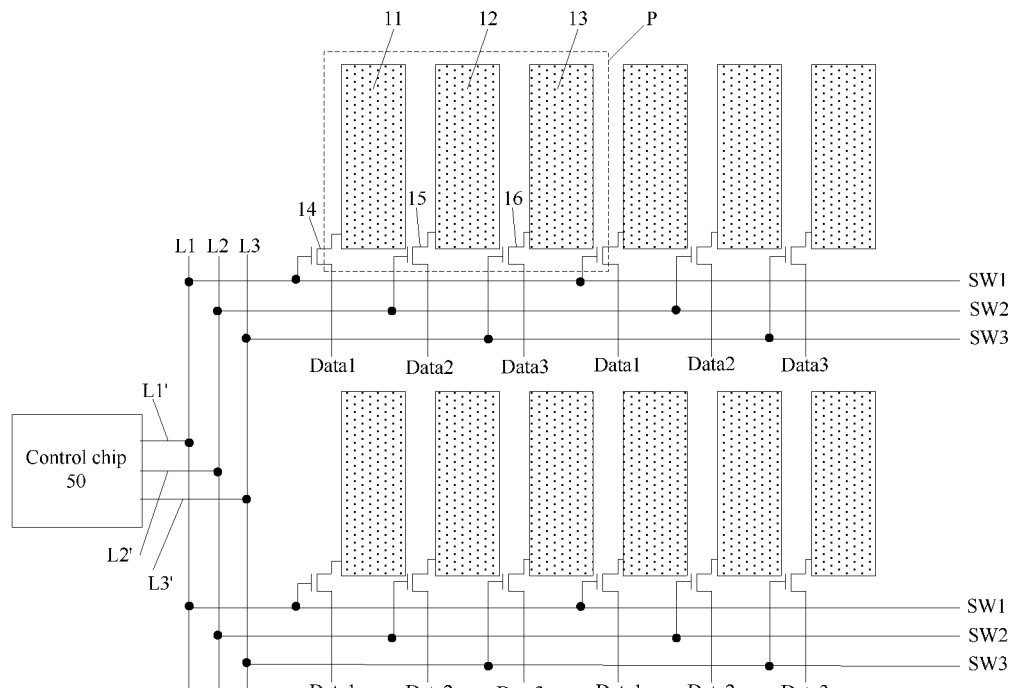
FIG. 3 is another plane structural diagram of the driving substrate provided by the first embodiment of the present disclosure.

In the structure of the driving substrate 1 as introduced above, input ends of the respective driving switch transistors within a same pixel region P are connected with a same data line Data. Alternatively, the input ends of the respective driving switch transistors within the same pixel region P may be connected with different data lines Data respectively. With reference to FIG. 3, the driving switch transistors and the driving lines in the driving substrate are arranged in a same manner as those in the above-described driving substrate of FIG. 2. The difference includes: in the driving substrate shown in FIG. 3, each pixel region P corresponds to three data lines, and the three data lines are respectively, a first data line Data1, a second data line Data2 and a third data line Data3; an input end of the first driving switch transistor 14 in a respective pixel region P is connected with a first data line Data1 corresponding to the pixel region P, an input end of the second driving switch transistor 15 in a respective pixel region P is connected with a second data line Data2 corresponding to the pixel region P, and an input end of the third driving switch transistor 16 is connected with a third data line Data3 corresponding to the pixel region P.

With respect to the above-described driving substrate (i.e., the driving substrate shown in FIG. 3) in which the input ends of the respective driving switch transistors within a same pixel region P are connected with different data lines, it may be driven by using a same driving process of the driving substrate shown in FIG. 2. In addition, the gate voltages may be simultaneously applied to the respective first driving lines SW1, the respective second driving lines SW2 and the respective third driving lines SW3, so as to simultaneously turn on the respective first driving switch transistors 14, the respective second driving switch transistors 15 and the respective third driving switch transistors 16. In addition, corresponding data voltages are applied to the respective first data lines Data1, the respective second data lines Data2 and the respective third data lines Data3 simultaneously, so that the respective first driving electrodes 11, the respective second driving electrodes 12 and the respective third driving electrodes 13 can simultaneously drive the corresponding liquid crystal molecules to deflect, causing the respective pixels to be respectively equivalent to liquid crystal lenses having different curvatures. In this driving mode, the application of the gate voltages and the application of the data voltages are both simultaneously applied, rather than being sequentially applied, which simplifies the driving process, and prolongs the time for the driving electrodes to receive the data voltages. Thus, more time is reserved for the liquid crystal molecules to respond, so that the liquid crystal molecules can be further deflected in place, so that the curvatures of the liquid crystal lenses equivalent to the respective pixels are closer to ideal curvatures, and the gray scales finally displayed by the pixels are closer to ideal gray scales, which improves display quality.

With reference to FIG. 2 and FIG. 3 again, with respect to the driving substrate (i.e., the driving substrate shown in FIG. 2) in which the input ends of the respective driving switch transistors within a same pixel region P are connected with a same data line, and the driving substrate (i.e., the driving substrate shown in FIG. 3) in which the respective driving switch transistors within a same pixel region P are respectively connected with different data lines as described above, within a frame region of the driving substrate it is possible that: the first driving lines SW1 corresponding to respective rows of pixel regions P are connected through a same first connection line L1, and the first connection line L1 is connected with the control chip through a first lead L1'; the second driving lines SW2 corresponding to respective rows of pixel regions P are connected through a same second connection line L2, and the second connection line L2 is connected with the control chip through a second lead L2'; and the third driving lines SW3 corresponding to respective rows of pixel regions P are connected through a same third connection line L3, and the third connection line L3 is connected with the control chip through a third lead L3'. With the above-described structure, the driving lines of the entire driving substrate can be led out to the control chip only by the leads, i.e., the first lead L1', the second lead L2' and the third lead L3', to implement connection with the control chip, so as to further reduce the number of wires and the wiring area on the driving substrate.

As shown in FIG. 2, within each pixel region P, the data line Data which is connected with the respective driving switch transistors in the pixel region P may also be connected with a data driver 52 of the control chip 50 through a corresponding connection line. Of course, within each pixel region P in FIG. 3, the data lines Data1, Data2 and Data3 respectively connected with the driving switch transistors 14, 15 and 16 in the pixel region P may also be connected with the data driver 52 of the control chip 50 through different connection lines.

Figure 4:
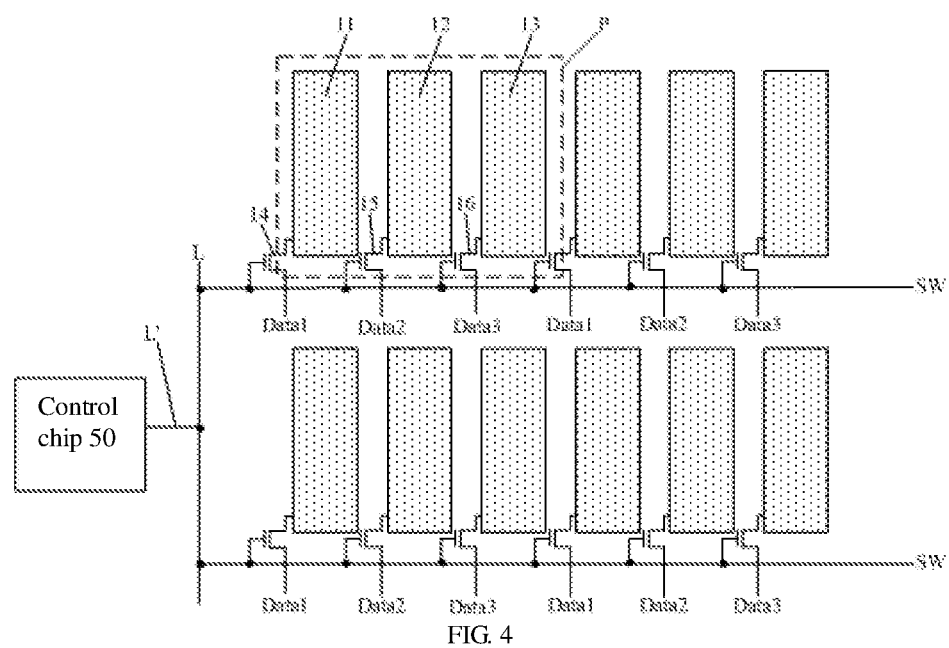
FIG. 4 is yet another plane structural diagram of the driving substrate provided by the first embodiment of the present disclosure.

In the driving substrate shown in FIG. 3, the control ends of the first driving switch transistors 14 within the respective pixel regions P are connected with the respective first driving lines SW1, the control ends of the second driving switch transistors 15 within the respective pixel regions P are connected with the respective second driving lines SW2, and the control ends of the third driving switch transistors 16 within the respective pixel regions P are connected with the respective third driving lines SW3. However, the control ends of the respective driving switch transistors within each row of pixel regions P may also be connected with a same driving line. For example, with reference to FIG. 4, the driving switch transistors and the data lines are provided in a same manner as that in the driving substrate shown in FIG. 3. The difference includes: each row of pixel regions P in the driving substrate shown in FIG. 4 corresponds to a driving line SW, that is, the control ends of the respective driving switch transistors (including the first driving switch transistors 14, the second driving switch transistors 15 and the third driving switch transistors 16) in each row of pixel regions P are all connected with a driving line SW corresponding to the row of pixel regions P. The driving substrate reduces the number of driving lines and facilitates further reduction in the number of wires and the wiring area on the driving substrate.

With respect to the above-described driving substrate (i.e., the driving substrate shown in FIG. 4) in which the control ends of the respective driving switch transistors within each row of pixel regions P are connected with the same driving line, its driving process includes: simultaneously applying a gate voltage to the respective driving lines SW, so as to simultaneously turn on the respective first driving switch transistors 14, the respective second driving switch transistors 15 and the respective third driving switch transistors 16; and simultaneously applying corresponding data voltages to the respective first data lines Data1, the respective second data lines Data2 and the respective third data lines Data3, so that the respective first driving electrodes 11, the respective second driving electrodes 12 and the respective third driving electrodes 13 simultaneously drive the corresponding liquid crystal molecules to deflect. Thus, the respective pixels are respectively equivalent to liquid crystal lenses having different curvatures.

With reference to FIG. 4 again, with respect to the above-described driving substrate (i.e., the driving substrate shown in FIG. 4) in which the control ends of the respective driving switch transistors within each row of pixel regions P are connected with the same driving line, within the frame region of the driving substrate it is possible that: the driving lines SW corresponding to respective rows of pixel regions are connected through a connection line L, and the connection line L is connected with the control chip through a lead L'. With the structure, the entire driving lines of the entire driving substrate can be led out by only one lead L' to implement connection with the control chip, so as to further reduce the number of wires and the wiring area on the driving substrate. Of course, within each pixel region P in FIG. 4, the data lines Data1, Data2 and Data3 respectively connected with the driving switch transistors 14, 15 and 16 in the pixel region may be respectively connected with the data driver 52 of the control chip 50 through different connection lines.

Second Embodiment

This embodiment provides a driving method of a driving substrate, and the driving method is used for driving the driving substrate as described in the first embodiment. The driving method comprises: decomposing an image frame into at least a first color image, a second color image, and a third color image, and dividing a time period of one frame into at least a first time period, a second time period and a third time period; in the first time period, applying a first group of data voltages to the driving electrodes within each pixel region of the driving substrate, to control corresponding pixels to be equivalent to liquid crystal lenses having first curvatures, so that the corresponding pixels display gray scales of the first color image; in the second time period, applying a second group of data voltages to the driving electrodes within each pixel region, to control the corresponding pixels to be equivalent to liquid crystal lenses having second curvatures, so that the corresponding pixels display gray scales of the second color image; and in the third time period, applying a third group of data voltages to the driving electrodes within each pixel region, to control the corresponding pixels to be equivalent to liquid crystal lenses having third curvatures, so that the corresponding pixels display gray scales of the third color image.

In the above-described driving method of the driving substrate, an image frame is decomposed into images of at least three colors, a time period of one frame is divided into at least three time periods, and an image of a corresponding color is respectively displayed in a respective time period. Thus, by using a visual staying phenomenon of human eyes, images of different colors seen by human eyes in the respective time periods can be synthesized into the complete image frame, so as to implement normal display of the image. Since in each time period it only needs to display an image of one color, each pixel in each time period only needs to display one gray scale. Thus, each pixel in each time period only needs to be equivalent to one liquid crystal lens, so as to reduce the number of driving electrodes on the driving substrate for driving the pixel to be equivalent to the liquid crystal lens. Further, the number of wires and the wiring area are reduced, which facilitates reduction of a frame of the driving substrate and improves a pixel aperture ratio of the driving substrate.

Generally, color of an image frame is synthesized by three primary colors, i.e., red, green and blue. Thus, an image frame at least may be decomposed into a red image, a green image and a blue image. For example, the above-described first color image is the red image, the above-described second color image is the green image, and the above-described third color image is the blue image.

In the above-described driving method, before applying the data voltages to the driving electrodes, it firstly needs to obtain the data voltages needed by the respective driving electrodes. A method for obtaining the data voltages needed by the respective driving electrodes includes: with a gray scale of each pixel in the first color image of an image frame being known, a curvature (i.e., a first curvature) of a liquid crystal lens, which a respective pixel in the first time period of the image frame needs to be equivalent, can be obtained, and then the data voltages, i.e., a first group of data voltages, needed by the respective driving electrodes in respective pixels during the first time period of the frame can be obtained. It should be noted that, since gray scales of the respective pixels in the first color image are different, data voltages in the first group of data voltages needed by the respective pixels are different. Likewise, the second group of data voltages and the third group of data voltages may be obtained.

Hereinafter, the driving method of the driving substrate provided by this embodiment will be described in detail in combination with a driving substrate having a specific structure.

Figure 5:
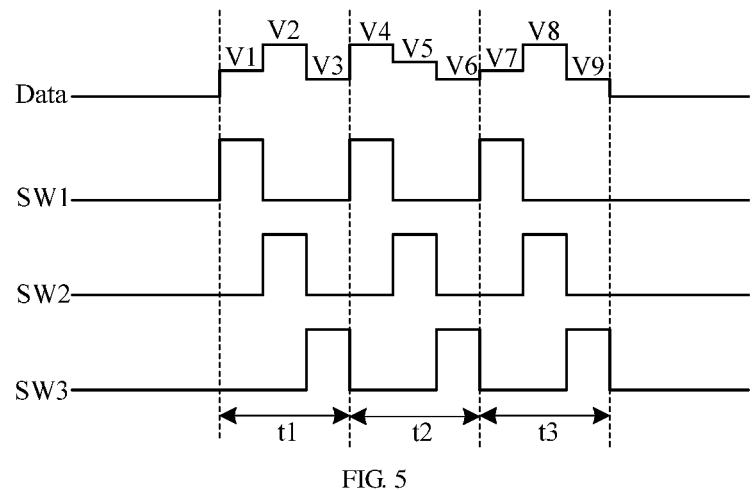
FIG. 5 is a timing sequence diagram of a driving method provided by a second embodiment of the present disclosure.

With reference to FIG. 2 again, with respect to the driving substrate as shown in FIG. 2, its driving method may specifically comprise, for each pixel region P: with reference to FIG. 5, in a first time period t1, sequentially inputting a gate driving voltage to a first driving line SW1, a second driving line SW2 and a third driving line SW3, and sequentially inputting a first data voltage V1, a second data voltage V2 and a third data voltage V3 to a data line Data corresponding to the pixel region P, where the first data voltage V1, the second data voltage V2 and the third data voltage V3 belong to the first group of data voltages. Thus, the first driving electrode 11, the second driving electrode 12 and the third driving electrode 13 respectively drive the respective liquid crystal molecules corresponding thereto to deflect, so that the respective pixel is equivalent to a liquid crystal lens having a first curvature. Thus, the respective pixel displays a respective gray scale corresponding thereto, to implement display of the first color image.

Likewise, in a second time period t2, the driving method includes, for each pixel region P: sequentially inputting a gate driving voltage to the first driving line SW1, the second driving line SW2 and the third driving line SW3, and sequentially inputting a fourth data voltage V4, a fifth data voltage V5 and a sixth data voltage V6 to the data line Data corresponding to the pixel region P, where the fourth data voltage V4, the fifth data voltage V5 and the sixth data voltage V6 belong to the second group of data voltages, so that the first driving electrode 11, the second driving electrode 12 and the third driving electrode 13 respectively drive the respective liquid crystal molecules corresponding thereto to deflect, so that the respective pixel is equivalent to a liquid crystal lens having a second curvature. Thus, the respective pixel displays a respective gray scale corresponding thereto, to implement display of the second color image.

Likewise, in a third time period t3, the driving method includes, for each pixel region P: sequentially inputting a gate driving voltage to the first driving line SW1, the second driving line SW2 and the third driving line SW3, and sequentially inputting a seventh data voltage V7, an eighth data voltage V8 and a ninth data voltage V9 to the data line Data corresponding to the pixel region P, where the seventh data voltage V7, the eighth data voltage V8 and the ninth data voltage V9 belong to the third group of data voltages, so that the first driving electrode 11, the second driving electrode 12 and the third driving electrode 13 respectively drive the respective liquid crystal molecules corresponding thereto to deflect, so that the respective pixel is equivalent to a liquid crystal lens having a third curvature. Thus, the respective pixel displays a respective gray scale corresponding thereto, to implement display of the third color image.

With reference to FIG. 3 again, with respect to the driving substrate shown in FIG. 3, since the output ends of the respective driving switch transistors within a same pixel region P are respectively connected with different data lines, the driving method of the driving substrate shown in FIG. 3 may specifically comprise, for each pixel region P: in the first time period, sequentially inputting the gate driving voltage to the first driving line SW1, the second driving line SW2 and the third driving line SW3, and simultaneously inputting a first data voltage, a second data voltage and a third data voltage to a first data line Data1, a second data line Data2 and a third data line Data3 respectively, where the first data voltage, the second data voltage and the third data voltage belong to the first group of data voltages, so as to implement display of the first color image. Likewise, in the second time period, the input data voltages are changed into the second group of data voltages, so as to implement display of the second color image; and in the third time period, the input data voltages are changed into the third group of data voltages, so as to implement display of the third color image. Since the respective data voltages in each group of data voltages are all input simultaneously, the driving process is simplified and more time is reserved for the liquid crystal molecules to respond, which is advantageous to improvement of display quality.

With reference to FIG. 4 again, with respect to the driving substrate shown in FIG. 4, since one row of pixel regions P correspond to only one driving line SW, and the output ends of the respective driving switch transistors in a same pixel region P are respectively connected with different data lines, the driving method of the driving substrate shown in FIG. 4 may specifically comprise: in the first time period, simultaneously inputting the gate driving voltage to the respective driving lines, and simultaneously inputting respective first data voltages, respective second data voltages and respective third data voltages to the first data lines Data1, the second data lines Data2 and the third data lines Data3 respectively, where the respective first data voltages, the respective second data voltages and the respective third data voltages belong to the first group of data voltages, so as to implement display of the first color image. Likewise, in the second time period, the input data voltages are changed into the second group of data voltages, so as to implement display of the second color image; and in the third time period, the input data voltages are changed into the third group of data voltages, so as to implement display of the third color image. Since the gate driving voltages are input simultaneously, and the respective data voltages in each group of data voltages are also input simultaneously, the driving process is simplified and more time is reserved for the liquid crystal molecules to respond, which is advantageous to improvement of display quality.

Third Embodiment

Figure 6:
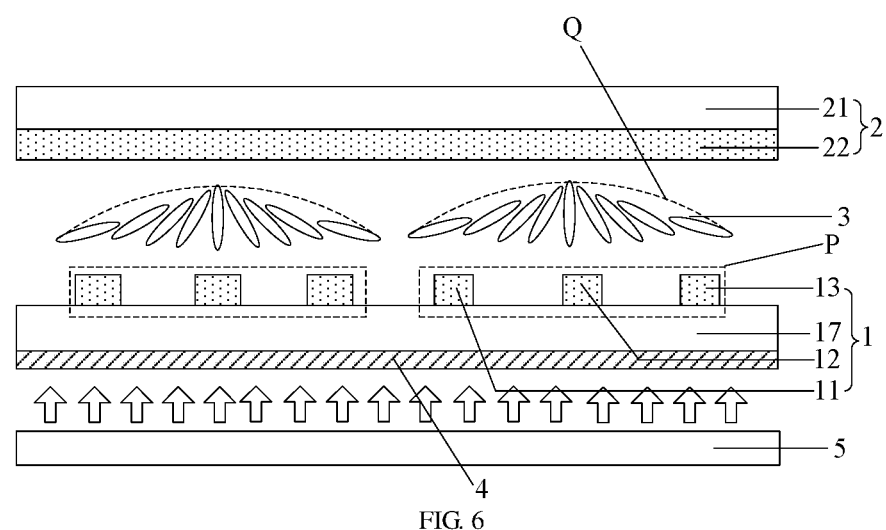
FIG. 6 is a cross-sectional structural schematic diagram of a liquid crystal display device provided by a third embodiment of the present disclosure.

With reference to FIG. 6, this embodiment provides a liquid crystal display device, the liquid crystal display device comprising a driving substrate 1, a common substrate 2, a liquid crystal layer 3, a polarizer 4, and a backlight module 5, where the driving substrate 1 is any driving substrate 1 as described in the first embodiment. The driving substrate 1 includes a base substrate 17, a plurality of driving electrodes 11, 12 and 13 provided on the base substrate 17, and a control chip provided on the periphery of the base substrate 17 (not shown in FIG. 6). The common substrate 2 and the driving substrate 1 are provided opposite to each other, the common substrate 2 includes a transparent substrate 21 and a common electrode 22 provided on the transparent substrate 21. The liquid crystal layer 3 is provided between the driving substrate 1 and the common substrate 2. The polarizer 4 is provided on a side of the driving substrate 1 away from the liquid crystal layer 3, or is provided on a side of the common substrate 2 away from the liquid crystal layer 3. The backlight module 5 is provided on a side of the polarizer 4 away from the liquid crystal layer 3, and the backlight module 5 is capable of emitting light of a first color in a first time period, emitting light of a second color in a second time period, and emitting light of a third color in a third time period.

Since a wiring area of any driving substrate 1 as described in the first embodiment is reduced as compared with that in the prior art, a frame width of the liquid crystal display device comprising the driving substrate 1 according to this embodiment is reduced as compared with that in a same type of liquid crystal display devices in the prior art, and a pixel aperture ratio is increased as compared with that in a same type of liquid crystal display devices in the prior art.

In addition, since the liquid crystal display device provided by this embodiment controls a color of an image displayed in a respective time period through the backlight module, it does not need to include a color filter layer to filter light so as to control colors of respective sub-pixels, and thus, potential light loss caused by light filtering with the color filter layer is avoided, and light utilization efficiency is improved. In addition, since the liquid crystal display device provided by this embodiment implements control of a gray scale of each pixel with the driving substrate 1, it does not need to provide two polarizers to implement gray scale display. One polarizer is omitted, and thus, light loss caused by polarization analysis with the polarizer is avoided, and light utilization efficiency of the liquid crystal display device is improved.

An operation process of the liquid crystal display device provided by this embodiment includes: decomposing one image frame to be displayed into at least a first color image, a second color image and a third color image, and dividing a time period of the image frame into at least a first time period, a second time period and a third time period. The control chip of the driving substrate 1 determines a gray scale to be displayed by each pixel according to a color image to be displayed in each time period, so as to determine a curvature of a liquid crystal lens Q to be equivalent to each pixel, and then determines data voltages which need to be applied to the respective driving electrodes in each pixel region. In the first time period of each frame, data voltages are applied to the driving electrodes of the driving substrate 1, and at the same time, a common voltage is applied to a common electrode 22 of a common substrate 2. Thus, an electric field is formed between the driving electrodes and the common electrode 22, to drive the liquid crystal molecules to deflect. Thus, the respective pixels are respectively equivalent to liquid crystal lenses Q having curvatures needed by respective pixels of the first color image. The backlight module 5 emits light rays of the first color. The light rays of the first color pass through the respective equivalent liquid crystal lenses Q, and their divergence degrees change, so that the gray scales displayed by the pixels are gray scales of the first color image, in order to implement display of the first color image. Likewise, in the second time period, the respective pixels are respectively equivalent to liquid crystal lenses Q having curvatures needed by respective pixels of the second color image. The backlight module 5 emits light rays of the second color, to implement display of the second color image. Likewise, in the third time period, the respective pixels are respectively equivalent to liquid crystal lenses Q having curvatures needed by respective pixels of the third color image, and the backlight module 5 emits light rays of the third color, so as to implement display of the third color image. By using a visual staying phenomenon of human eyes, the first color image displayed in the first time period, the second color image displayed in the second time period, and the third color image displayed in the third time period are superimposed to synthesize into the complete image frame.

It should be noted that the liquid crystal display device provided by this embodiment may be any product or component having a display function, such as a liquid crystal panel, an electronic paper, a mobile phone, a tablet personal computer, a television, a display, a notebook computer, a digital photo frame, a navigator, etc.

In the driving substrate and the driving method thereof and the liquid crystal display device provided by embodiments of the present disclosure, by decomposing an image frame into images of at least three colors, dividing the time period of one frame into at least three time periods, and respectively displaying an image of a corresponding color in a respective time period, images of different colors seen by human eyes in respective time periods are synthesized into a complete image frame by using a visual staying phenomenon of human eyes. Thus, normal display of the image is implemented. Based on this, since in each time period, it only needs to display an image of one color, each pixel in each time period only needs to display one gray scale. That is to say, when the data voltages are applied to the driving electrodes so that the pixels are equivalent to liquid crystal lenses, each pixel in each time period only needs to be equivalent to one liquid crystal lens. It can be seen that, as compared in the case in the prior art where each pixel needs to be equivalent to at least three liquid crystal lenses (each pixel at least includes three sub-pixels, and each sub-pixel needs to be equivalent to one liquid crystal lens), in the embodiments of the present disclosure, a quantity of liquid crystal lenses that each pixel needs to be equivalent to is reduced to one. Thus, the number of driving electrodes on the driving substrate 1 for driving the pixels to be equivalent to the liquid crystal lenses can be reduced, which further reduces the number of corresponding wires, and reduce the needed wiring area.

In the present disclosure, terms such as "first", "second" and the like used in the present disclosure do not indicate any sequence, quantity or significance but only for distinguishing different constituent parts. Also, the terms such as "a," "an," or "the" etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects.

Obviously, those skilled in the art may modify the disclosure in various ways without breaking away from the spirits and scope of the disclosure. And so, if these changes and variations of the disclosure also fall within the scope of the claims or their equivalent technologies, the disclosure intends to include these changes and variations.

What are described above is related to the illustrative embodiments of the disclosure only and not limitative to the scope of the disclosure; any changes or replacements easily for those technical personnel who are familiar with this technology in the field to envisage in the scopes of the disclosure, should be in the scope of protection of the present disclosure. Therefore, the scopes of the disclosure are defined by the accompanying claims.

The present application claims the priority of the Chinese Patent Application No. 201610217800.8 filed on Apr. 8, 2016, which is incorporated herein by reference in its entirety as part of the disclosure of the present application.

The invention claimed is:

1. A driving substrate, comprising:
a base substrate having a plurality of pixel regions thereon;
a plurality of driving electrodes provided on the base substrate, each pixel region being provided therein with at least three of the plurality of driving electrodes; and
a control chip provided on a periphery of the base substrate, the control chip being connected with the plurality of driving electrodes;
wherein an image frame is decomposed into at least a first color image, a second color image and a third color image, a time period of the image frame is divided into at least a first time period, a second time period and a third time period, and the control chip is configured to:
in the first time period, apply a first group of data voltages to driving electrodes within each pixel region to control corresponding pixels to be equivalent to liquid crystal lenses having first curvatures, so that the corresponding pixels display gray scales of the first color image;
in the second time period, apply a second group of data voltages to the driving electrodes within each pixel region to control the corresponding pixels to be equivalent to liquid crystal lenses having second curvatures, so that the corresponding pixels display gray scales of the second color image; and
in the third time period, apply a third group of data voltages to the driving electrodes within each pixel region to control the corresponding pixels to be equivalent to liquid crystal lenses having third curvatures, so that the corresponding pixels display gray scales of the third color image,
the driving substrate further comprising a plurality of driving switch transistors provided on the base substrate, a plurality of driving lines and a plurality of data lines; wherein:
each pixel region is provided therein with at least three of the plurality of driving switch transistors, the driving electrodes within each pixel region correspond to the driving switch transistors one by one, and the driving electrodes are connected with output ends of the corresponding driving switch transistors;
each row of pixel regions corresponds to at least one of the plurality of driving lines, and control ends of the driving switch transistors are connected with corresponding driving lines;
each pixel region corresponds to at least one of the plurality of data lines, and output ends of the driving switch transistors are connected with corresponding data lines; and
the plurality of driving lines and the plurality of data lines are connected with the control chip, so that the control chip is connected with the plurality of driving electrodes.

2. The driving substrate according to claim 1, wherein:
each pixel region is provided therein with at least a first driving electrode, a second driving electrode, a third driving electrode, a first driving switch transistor corresponding to the first driving electrode, a second driving switch transistor corresponding to the second driving electrode, and a third driving switch transistor corresponding to the third driving electrode;
each row of pixel regions corresponds to a first driving line, a second driving line and a third driving line, a control end of the first driving switch transistor is connected with a corresponding first driving line, a control end of the second driving switch transistor is connected with a corresponding second driving line, and a control end of the third driving switch transistor is connected with a corresponding third driving line; and
each pixel region corresponds to one data line of the plurality of data lines.

3. The driving substrate according to claim 1, wherein:
each pixel region is provided therein with at least a first driving electrode, a second driving electrode, a third driving electrode, a first driving switch transistor corresponding to the first driving electrode, a second driving switch transistor corresponding to the second driving electrode, and a third driving switch transistor corresponding to the third driving electrode;
each row of pixel regions corresponds to a first driving line, a second driving line and a third driving line, a control end of the first driving switch transistor is connected with a corresponding first driving line, a control end of the second driving switch transistor is connected with a corresponding second driving line and a control end of the third driving switch transistor is connected with a corresponding third driving line; and
each pixel region corresponds to a first data line, a second data line and a third data line, an input end of the first driving switch transistor is connected with a corresponding first data line, an input end of the second driving switch transistor is connected with a corresponding second data line and an input end of the third driving switch transistor is connected with a corresponding third data line.

4. The driving substrate according to claim 2, wherein within a frame region of the base substrate:
first driving lines corresponding to respective rows of pixel regions are connected through a first connection line, and are connected with the control chip through a first lead;
second driving lines corresponding to respective rows of pixel regions are connected through a second connection line, and are connected with the control chip through a second lead; and
third driving lines corresponding to respective rows of pixel regions are connected through a third connection line, and are connected with the control chip through a third lead.

5. The driving substrate according to claim 1, wherein:
each pixel region is provided therein with at least a first driving electrode, a second driving electrode, a third driving electrode, a first driving switch transistor corresponding to the first driving electrode, a second driving switch transistor corresponding to the second driving electrode, and a third driving switch transistor corresponding to the third driving electrode;
each row of pixel regions corresponds to a driving line; and
each pixel region corresponds to a first data line, a second data line and a third data line, an input end of the first driving switch transistor is connected with a corresponding first data line, an input end of the second driving switch transistor is connected with a corresponding second data line and an input end of the third driving switch transistor is connected with a corresponding third data line.

6. The driving substrate according to claim 5, wherein within a frame region of the base substrate, driving lines corresponding to respective rows of pixel regions are connected through a connection line, and are connected with the control chip through a lead.

7. The driving substrate according to claim 1, wherein the control chip includes:
   a gate driver connected with the plurality of driving lines, the gate driver being configured to: control driving switch transistors within each pixel region to be turned on in the first time period, and control the driving switch transistors within each pixel region to be turned on in the second time period, and control the driving switch transistors within each pixel region to be turned on in the third time period; and
   a data driver connected with the plurality of data lines, the data driver being configured to: input the first group of data voltages to the driving switch transistors within each pixel region in the first time period; input the second group of data voltages to the driving switch transistors within each pixel region in the second time period; and input the third group of data voltages to the driving switch transistors within each pixel region in the third time period.

8. The driving substrate according to claim 1, wherein a quantity of driving electrodes provided in each pixel region is 3 to 8.

9. A driving method of the driving substrate according to claim 1, comprising:
   decomposing an image frame into at least a first color image, a second color image, and a third color image, and dividing a time period of the image frame into at least a first time period, a second time period and a third time period;
   in the first time period, applying a first group of data voltages to the driving electrodes within each pixel region of the driving substrate to control corresponding pixels to be equivalent to liquid crystal lenses having first curvatures, so that the corresponding pixels display gray scales of the first color image;
   in the second time period, applying a second group of data voltages to the driving electrodes within each pixel region to control the corresponding pixels to be equivalent to liquid crystal lenses having second curvatures, so that the corresponding pixels display gray scales of the second color image; and
   in the third time period, applying a third group of data voltages to the driving electrodes within each pixel region to control the corresponding pixels to be equivalent to liquid crystal lenses having third curvatures, so that the corresponding pixels display gray scales of the third color image.

10. The driving method of the driving substrate according to claim 9, wherein the first color image is a red image, the second color image is a green image, and the third color image is a blue image.

11. The driving method of the driving substrate according to claim 9, comprising:
    in the first time period, sequentially inputting a gate driving voltage to a first driving line, a second driving line and a third driving line, and sequentially inputting a respective first data voltage, a respective second data voltage and a respective third data voltage to a respective data line corresponding to each pixel region, wherein the respective first data voltage, the respective second data voltage and the respective third data voltage belong to the first group of data voltages;
    in the second time period, sequentially inputting the gate driving voltage to the first driving line, the second driving line and the third driving line, and sequentially inputting a respective fourth data voltage, a respective fifth data voltage and a respective sixth data voltage to the respective data line corresponding to each pixel region, wherein the respective fourth data voltage, the respective fifth data voltage and the respective sixth data voltage belong to the second group of data voltages; and
    in the third time period, sequentially inputting the gate driving voltage to the first driving line, the second driving line and the third driving line, and sequentially inputting a respective seventh data voltage, a respective eighth data voltage and a respective ninth data voltage to the respective data line corresponding to each pixel region, wherein the respective seventh data voltage, the respective eighth data voltage and the respective ninth data voltage belong to the third group of data voltages.

12. The driving method of the driving substrate according to claim 9, comprising:
    in the first time period, sequentially inputting a gate driving voltage to a first driving line, a second driving line and a third driving line, and simultaneously inputting a respective first data voltage to a first data line, inputting a respective second data voltage to a second data line, and inputting a respective third data voltage to a third data line, wherein the respective first data voltage, the respective second data voltage and the respective third data voltage belong to the first group of data voltages;
    in the second time period, sequentially inputting the gate driving voltage to the first driving line, the second driving line and the third driving line, and simultaneously inputting a respective fourth data voltage to the first data line, inputting a respective fifth data voltage to the second data line, and inputting a respective sixth data voltage to the third data line, wherein the respective fourth data voltage, the respective fifth data voltage and the respective sixth data voltage belong to the second group of data voltages; and
    in the third time period, sequentially inputting the gate driving voltage to the first driving line, the second driving line and the third driving line, and simultaneously inputting a respective seventh data voltage to the first data line, inputting a respective eighth data voltage to the second data line, and inputting a respective ninth data voltage to the third data line, wherein the respective seventh data voltage, the respective eighth data voltage and the respective ninth data voltage belong to the third group of data voltages.

13. The driving method of the driving substrate according to claim 9, comprising:
    in the first time period, simultaneously inputting a gate driving voltage to respective driving lines, and at the same time, inputting a respective first data voltage to a first data line, inputting a respective second data voltage to a second data line, and inputting a respective third data voltage to a third data line, wherein the respective first data voltage, the respective second data voltage and the respective third data voltage belong to the first group of data voltages;
    in the second time period, simultaneously inputting the gate driving voltage to respective driving lines, and at the same time, inputting a respective fourth data voltage to the first data line, inputting a respective fifth data voltage to the second data line, and inputting a respective sixth data voltage to the third data line, wherein the respective fourth data voltage, the respective fifth data voltage and the respective sixth data voltage belong to the second group of data voltages;

in the third time period, simultaneously inputting the gate driving voltage to respective driving lines, and at the same time, inputting a respective seventh data voltage to the first data line, inputting a respective eighth data voltage to the second data line, and inputting a respective ninth data voltage to the third data line, wherein the respective seventh data voltage, the respective eighth data voltage and the respective ninth data voltage belong to the third group of data voltages.

14. A liquid crystal display device, comprising:
the driving substrate according to claim 1;
a common substrate provided opposite to the driving substrate, the common substrate including a transparent substrate and a common electrode provided on the transparent substrate;
a liquid crystal layer provided between the driving substrate and the common substrate;
a polarizer provided on a side of the driving substrate away from the liquid crystal layer or on a side of the common substrate away from the liquid crystal layer; and
a backlight module provided on a side of the liquid crystal layer away from the liquid crystal layer, the backlight module configured to emit light rays of a first color in a first time period of time, emit light rays of a second color in a second time period, and emit light rays of a third color in a third time period.

15. The driving substrate according to claim 3, wherein within a frame region of the base substrate:
first driving lines corresponding to respective rows of pixel regions are connected through a first connection line, and are connected with the control chip through a first lead;
second driving lines corresponding to respective rows of pixel regions are connected through a second connection line, and are connected with the control chip through a second lead; and
third driving lines corresponding to respective rows of pixel regions are connected through a third connection line, and are connected with the control chip through a third lead.

16. The driving substrate according to claim 2, wherein the control chip includes:
a gate driver connected with the plurality of driving lines, the gate driver being configured to: control driving switch transistors within each pixel region to be turned on in the first time period, and control the driving switch transistors within each pixel region to be turned on in the second time period, and control the driving switch transistors within each pixel region to be turned on in the third time period; and
a data driver connected with the plurality of data lines, the data driver being configured to: input the first group of data voltages to the driving switch transistors within each pixel region in the first time period; input the second group of data voltages to the driving switch transistors within each pixel region in the second time period; and input the third group of data voltages to the driving switch transistors within each pixel region in the third time period.

17. The driving substrate according to claim 3, wherein the control chip includes:
a gate driver connected with the plurality of driving lines, the gate driver being configured to: control driving switch transistors within each pixel region to be turned on in the first time period, and control the driving switch transistors within each pixel region to be turned on in the second time period, and control the driving switch transistors within each pixel region to be turned on in the third time period; and
a data driver connected with the plurality of data lines, the data driver being configured to: input the first group of data voltages to the driving switch transistors within each pixel region in the first time period; input the second group of data voltages to the driving switch transistors within each pixel region in the second time period; and input the third group of data voltages to the driving switch transistors within each pixel region in the third time period.

18. The driving substrate according to claim 2, wherein a quantity of driving electrodes provided in each pixel region is 3 to 8.

* * * * *